Figure 1:
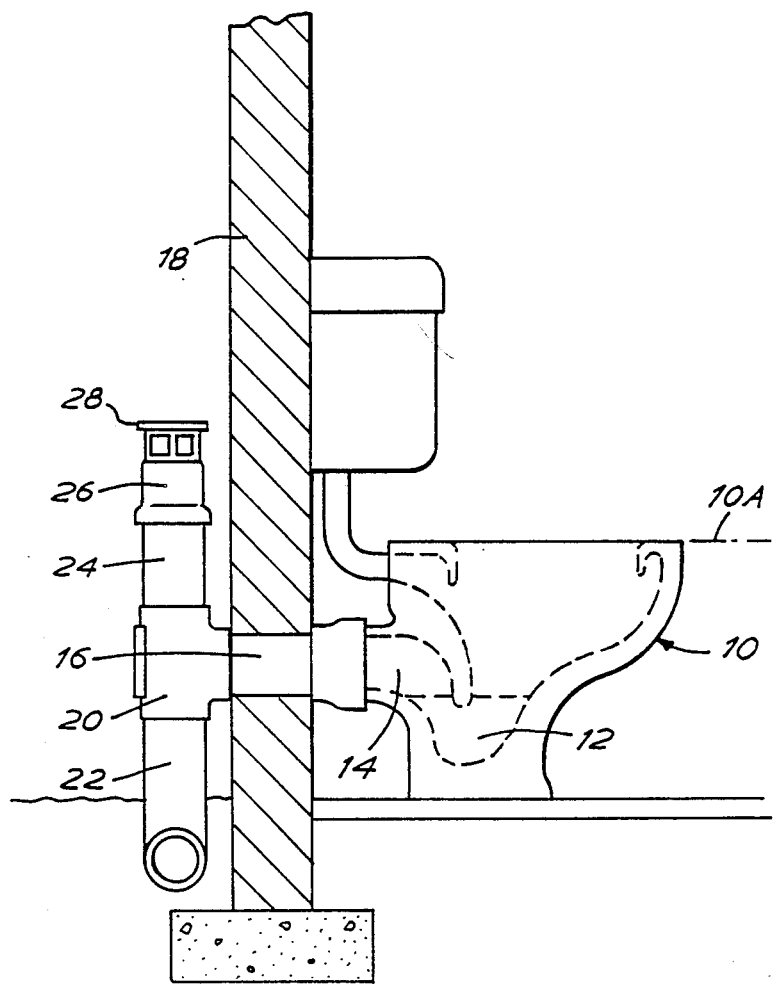

United States Patent [19]

van Deventer et al.

[11] Patent Number: 4,962,548
[45] Date of Patent: Oct. 16, 1990

[54] VALVE ASSEMBLY

[75] Inventors: Ivor G. van Deventer; Gerrit R. C. di Somma, both of Midrand, South Africa

[73] Assignee: G.I. Marketing CC, Midrand, South Africa

[21] Appl. No.: 241,243

[22] Filed: Sep. 7, 1988

[30] Foreign Application Priority Data

Sep. 7, 1987 [ZA] South Africa ............... 87/6659
Nov. 13, 1987 [ZA] South Africa ............... 87/8520

[51] Int. Cl.⁵ .................................... E03F 5/08
[52] U.S. Cl. ............................. 4/211; 4/219; 137/216.2; 137/493.8; 137/512.1; 137/526
[58] Field of Search ............... 4/209 R, 211, 216, 218, 4/219; 137/216.2, 493.8, 512.1, 526

[56] References Cited

U.S. PATENT DOCUMENTS

| | | | |
|---|---|---|---|
| 204,135 | 5/1878 | Convery | 137/216.2 |
| 507,636 | 10/1893 | Schneider | 137/493.8 |
| 1,235,558 | 8/1917 | Laval | 137/512.1 |
| 1,978,507 | 10/1934 | Rand | 4/211 |
| 2,351,874 | 6/1944 | Parker | 137/493.8 |
| 2,405,241 | 8/1946 | Smith | 137/526 |
| 2,461,392 | 2/1949 | Parry | 4/211 X |
| 3,605,132 | 9/1971 | Lineback | 4/211 |
| 3,815,629 | 6/1974 | Oberholtzer | 4/211 X |
| 4,518,014 | 5/1985 | McAlpine | 137/526 X |
| 4,556,084 | 12/1985 | Frawley | 137/526 |

FOREIGN PATENT DOCUMENTS

| | | |
|---|---|---|
| 1609244 | 3/1970 | Fed. Rep. of Germany . |
| 24202 | 10/1910 | United Kingdom ........ 4/219 |
| 2067228 | 7/1981 | United Kingdom ........ 4/211 |
| 2088023 | 6/1982 | United Kingdom . |

*Primary Examiner*—Gerald A. Michalsky
*Attorney, Agent, or Firm*—Cushman, Darby & Cushman

[57] ABSTRACT

A plumbing arrangement is described for a toilet pan connected to a waste disposal pipe. The waste pipe has an extension extending a short height above the flood level of the water trap. The upper end of the extension is closed off by a two way differential valve opening to the atmosphere. A cover is provided to permit the air flow to and from the valve but still to prevent the ingress of leaves or dirt which could have a detrimental effect upon the working of the valve. A number of embodiments of valve means are also described.

8 Claims, 4 Drawing Sheets

VALVE ASSEMBLY

This invention relates to valve systems particularly for use in the plumbing field.

In the plumbing field there is a problem in the provision of valve systems because of the internal diameter of the pipes being used. These pipes are large and large valves are required therefor.

Another problem which is encountered in the plumbing field relates the venting of lavatory pans. A lavatory pan is in practice connected behind the trap to a waste pipe for conveying away matter flushed from the pan. This waste pipe is normally provided with an extension pipe extending upwardly above the roof of the building (at least two meters above the location of the pan). This extension pipe provides a source of air to the waste pipe when matter is flushed down the pipe to prevent an airlock in the waste pipe or the syphoning dry of the water trap. Furthermore the upper extension of the waste pipe provides a safety feature for the plumbing in case there should be a blockage in the waste pipe. The feature of the waste pipe extension is technically satisfactory and is widely and extensively used in plumbing. However the provision of this extension has its disadvantages because of the extra costs involved in the erection of the extension, especially in tall buildings, and the fact that roofs have to be modified to accomodate these extensions and whenever a building is being decorated or re-decorated the extension pipe must itself be additionally painted separately from the wall beside which it is located.

According to one aspect of the invention there is provided a valve means particularly for use in a plumbing arrangement, the valve means comprising a housing, which is preferably cylindrical, having a cross-plate thereacross, at least one aperture through the cross-plate of smaller diameter than the cross-plate and a one-way valve controlling fluid flow through the aperture. The one-way valve preferably comprises a seat, a flexible disc which can seal on to the seat but which when there is excess pressure through the seat moves off the seat to permit fluid, normally gas, flow therethrough and spring means holding the disc on to the seat, the strength of the spring means determining the said excess pressure. The flexible disc is preferably provided with reinforcement means at its periphery. Such reinforcement can conveniently be a rim which seals against the cross-plate. Alternatively there may be an upstanding annular rim on the seat and on which the disc seals. There are preferably more than one such aperture and one-way valve therein.

According to another aspect of the invention there is provided a plumbing arrangement including a toilet pan incorporating a water trap, a waste disposal pipe connected to the pan and a waste pipe extension extending above the water trap, characterised in that the waste pipe extends only a short height above the pan flood level and there has a normally closed two way valve means leading to atmosphere. The valve means is preferably a differential valve opening to the atmosphere, the arrangement being such that only a small pressure difference is required to permit air to flow into the waste pipe extension and a larger pressure is required to allow air to escape. A cover is preferably provided to permit the air flow to and from the valve but still to prevent the ingress of leaves or dirt which could have a detrimental effect upon the working of the valve.

The valve means referred to in the preceeding paragraph is preferably as described in the paragraph preceeding that paragraph.

Figure 2:
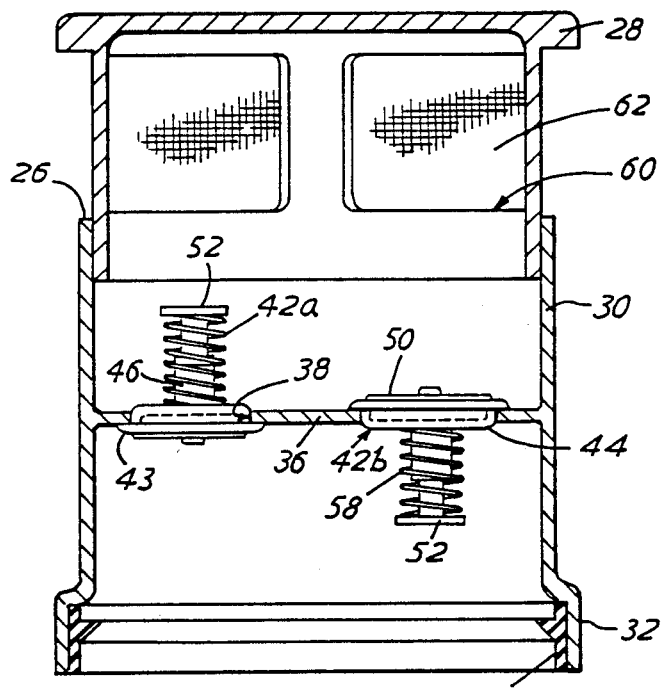
Figure 3:
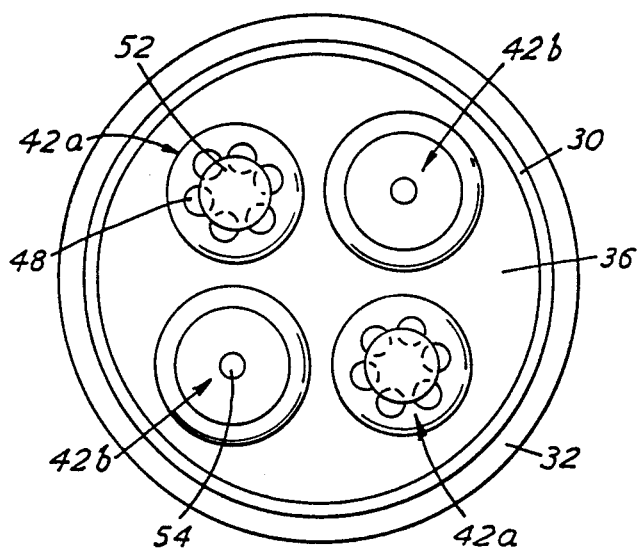
Figure 4:
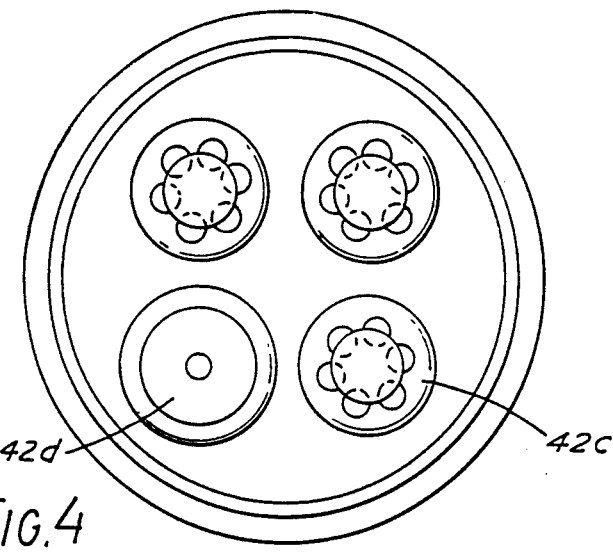
Figure 5:
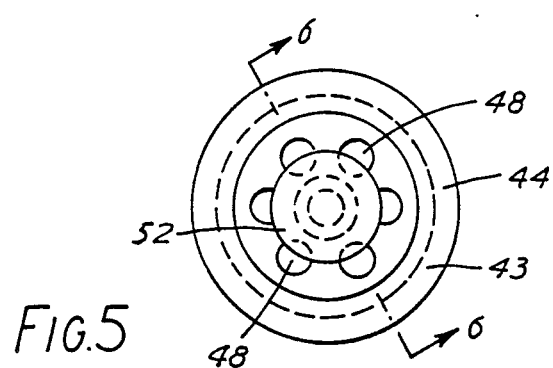
Figure 6:
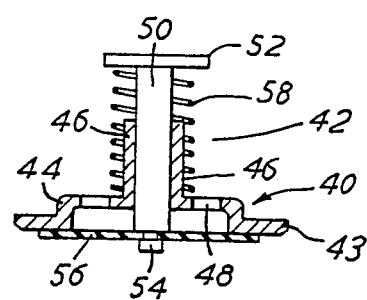
Figure 7:
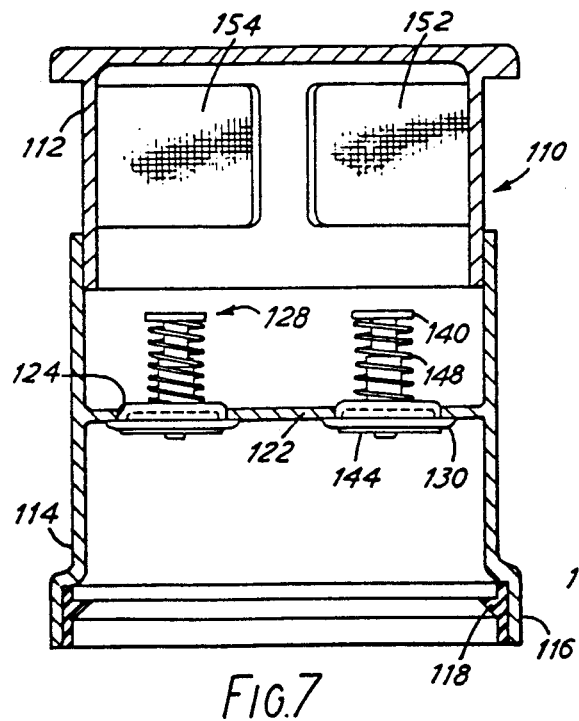
Figure 9:
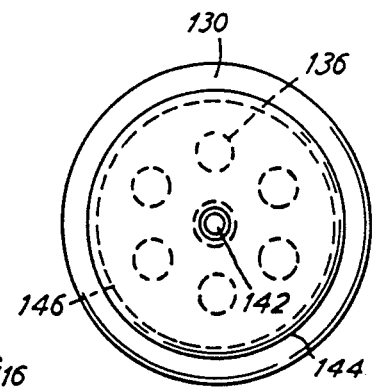
Figure 8:
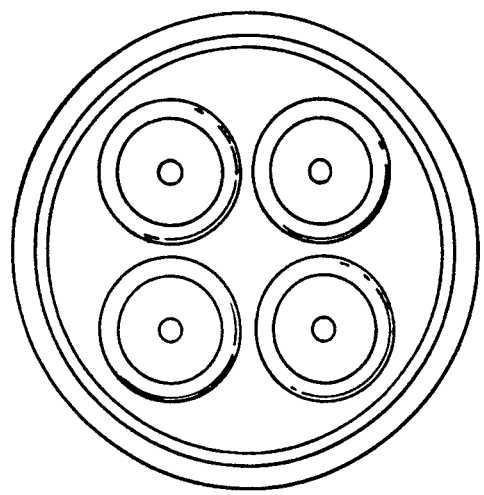
Figure 10:
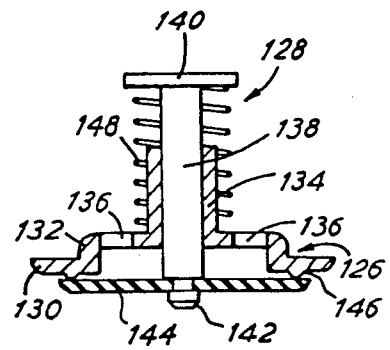

Embodiments of the invention will now be described by way of example with reference to the accompanying drawings in which:

FIG. 1 is a side view showing the plumbing arrangement of the invention for a toilet pan, FIG. 2 is a sectional side view of a vent valve housing of the invention, FIG. 3 is a plan of the vent valve housing with the cover removed, FIG. 4 is an under plan of a modified vent arrangement, FIG. 5 is a plan of a vent valve, FIG. 6 is a section on line 6—6 of FIG. 5, FIG. 7 is a sectional side view of a vent valve housing of the invention, FIG. 8 is an under plan of the vent valve housing with the cover removed, FIG. 9 is an underplan of a vent valve, and FIG. 10 is a section on line 10—10 of FIG. 9.

In FIG. 1 there is shown the plumbing arrangement of a toilet pan 10. The pan 10 has a conventional water trap 12. The level 10a of the upper edge of the pan 10 constitutes what is herein referred to as "the flood level" of the pan, i.e. the level above which water overflows from the pan. The spigot 14 of the pan 10, which is located above the trap 12, is connected to a pipe 16 which passes through the building wall 18 and then is connected through a "T"-piece 20 to a waste pipe 22 which extends downwardly. The waste pipe 22 has an upward extension 24 that extends upwardly from the "T"-piece 20 by a short amount of say a meter and above the flood level 10a of the pan.

At its upper end, the waste pipe extension 24 has a valve arrangement 26 and a cover 28 therefor The valve housing 26 comprises a cylindrical body 30 (see FIGS. 2 and 3) with a sealing socket 32 at its lower end to seal, through the intermediary of a sealing ring 34, on to the upper end of the waste pipe extension 24. A crossplate 36 spans the body 30. It has four apertures 38 therethrough equispaced about a pitch circle. Each is spanned by the body 40 of a one-way valve 42 (see FIGS. 5 and 6) which has a flange 43 secured to the cross-plate 36 with a low raised portion 44 received within the aperture 38 and a central tubular portion 46. A series of valve openings 48 extend through the raised portion 44.

The valve 42 further comprises a spindle 50 which is slidably received within the tubular portion 46 having an enlarged head 52 at one end and an undercut nose 54 at the other end. A centrally apertured Neoprene disc 56 having a diameter such that its periphery rests on the flange 43 is fitted on to the nose 54. A stainless steel spring 58 acts between the head 52 and the raised portion 44 to urge the disc 56 against the flange 43 thereby to act as a seal.

The valves 42 are arranged in pairs in diametrically opposed positions. One pair (valves 42a) permits air to enter into the waste pipe extension 24 from atmosphere, and the other pair (valves 42b) permits the egress of air from the extension to atmosphere. The springs 58 of the valves 42a are fairly light springs permitting easy entry of the air into the extension 24 when there is a low differential pressure whereas the springs 58 of the valves 42b are rather heavier.

The cover 28 is generally of inverted cup-shape with ports 60 in its sides. Woven stainless steel wire mesh 62 covers these ports.

As the upper end of the waste pipe extension 24 is such that the valve body 30 is above the flood level 10a of the pan 10, the pan will overflow before matter in the waste water can reach the valve arrangement and befoul the valves 42.

It will be noted that the height of the waste pipe extension 24 need be quite small and in any case not more than about a meter above the connection spigot 14 and the waste pipe 22, i.e. about half a meter above the flood level 10a of the pan 10.

Instead of the valves being arranged as shown in FIG. 3, these may be arranged three 42c opening one way (for the ingress of air into the waste extension) and one 42d the other (as shown in FIG. 4). Other numbers or permutations of valves may be provided, a very suitable alternative would be to have three valves, two to permit air into the waste extension and one for the egress of gasses therefrom.

We have found that each valve arrangement abovedescribed provides a satisfactory seal in normal circumstances to prevent gases with foul smells escaping from the waste pipe. It, the waste valve arrangement, does however act to permit air ingress to the waste pipe extension to prevent (a) air locks being formed in the waste pipe or (b) the syphoning dry of the pan trap 12. It further permits gases to escape should there be a blockage in the waste pipe. It will be appreciated that such gases when escaping will incorporate some foul smells but these will dissipate quickly in the atmosphere. However the smells will be noticeable for a few moments which will serve as a warning to the householder that a plumber must be called to cure the problem.

In FIG. 7, there is shown a valve arrangement 110 particularly for use in plumbing arrangements and a cover 112 therefor. The valve arrangement 110 comprises a cylindrical body 114 with a sealing socket 116 at its lower end to seal, through the intermediary of a sealing ring 118, on to the upper end of a waste pipe 120. A cross-plate 122 spans the body 114. It has four apertures 124 therethrough equispaced about a pitch circle. Each aperture 124 is spanned by the body 126 of a one-way valve 128 (see FIGS. 9 and 10) which is similar to the above described valve 42.

The valve 128 has a flange 130 secured to the cross-plate 122 with a low raised portion 132 received within the aperture 124 and a central tubular portion 134. A series of valve openings 136 extend through the raised portion 132. The valve 128 further comprises a spindle 138 which is slidably received within the tubular portion 134 having an enlarged head 140 at one end and an undercut nose 142 at the other end. A centrally apertured Neoprene disc 144 having a diameter greater than the interior of the portion 132 is fitted on to the nose 142. On its underside the flange 130 is provided with a low upstanding round nosed circular rim 146 against which the disc 144 seals. A stainless steel spring 148 acts between the head 140 and the raised portion 132 to urge the disc 144 into the sealing position.

The valves 128 are arranged all opening in the same direction.

A cover 150 which is generally of inverted cup-shape with ports 152 in its sides is provided. Woven stainless steel wire mesh 154 covers these ports 152.

We have found that the valve arrangements abovedescribed provide a satisfactory seal in normal circumstances while permitting the ingress of air into a drain pipe e.g. a lavatory waste pipe, water drain pipes or other plumbing pipes that require such ingress. Because of the small outside diameter of the discs 144 these keep a relatively rigid configuration which enables improved sealing to take place. The discs may be reinforced near their periphery. The sealing is improved also by the provision of the rims 146 which provide line sealing.

By having a number of valves 128 in the cross-piece 122 it is possible to provide an adequate valve through passage without losing the facility to maintain good sealing. This is particularly advantageous in plumbing arrangements where the pipes to be sealed are of large diameter.

Instead of the valves being arranged as shown above, these may be arranged howsoever is convenient. Other numbers from one or more or permutations of valves may be provided.

The invention is not limited to the precise constructional details hereinbefore described and as illustrated above. For example the valve springs may be of the same strength so that the valves open at the same pressures for ingress and escape of gases from the waste pipe extension. The disc may comprise Silicone rubber instead of Neoprene.

Further if desired two oppositely opening valves may be connected to the upper end of the waste pipe extension. These valves may be provided respectively in small extension arms that extend from the sides of the waste pipe extension.

We claim:

1. A plumbing arrangement comprising:
   a toilet pan incorporating a water trap,
   a waste disposal pipe connected to the pan,
   a waste pipe extension extending above the water trap, the waste pipe extending only a short height above the pan, and
   normally closed two-way valve means openable in both flow directions at different times to vent the waste pipe extension to atmosphere and to permit air to enter the waste pipe extension from the atmosphere,
   wherein the valve means comprises two one-way valves disposed to operate in opposite flow directions.

2. An arrangement as claimed in claim 1 wherein the height of the valve means is above the flood line of the pan.

3. An arrangement as claimed in claim 2 wherein the height of the valve means is no more than half a meter above the flood line of the pan.

4. A plumbing arrangement comprising:
   a. a toilet pan incorporating a water trap,
   b. a waste disposal pipe connected to the pan,
   c. a waste pipe extension which extends only a short height extending above the pan, and
   d. normally closed two-way valve means provided for the said waste pipe extension above the level of the said pan, which valve means are openable in both flow directions at different times to vent the waste pipe extension to atmosphere and to permit air to enter the waste pipe extension from the atmosphere, and which valve means comprise:
      d.1 a housing
      d.2 a cross-plate across the housing, d.3 at least one aperture through the cross-plate of smaller diameter than the cross-plate, and d.4 a one-way valve controlling fluid flow through the aperture.

5. A plumbing arrangement as claimed in claim 4 comprising a plurality of apertures through said cross-plate and a plurality of valves respectively controlling fluid flow through said apertures.

6. A plumbing arrangemnt as claimed in claim 5 wherein at least one valve opens to permit fluid flow in one direction and at least one valve opens to permit fluid flow in the opposite direction.

7. A valve as claimed in claim 6 wherein the valves opening in opposite directions are arranged to open at different pressures.

8. An arrangement as claimed in claim 4 wherein a cover is provided to permit the air flow to and from the valve but still to prevent the ingress of leaves or dirt which could have a detrimental effect upon the working of the valve.

* * * * *